July 7, 1959 J. G. SINCLAIR, JR 2,894,223

ELECTRICAL DELAY LINES

Filed March 30, 1956

INVENTOR.
JOHN G. SINCLAIR JR.,
BY

ATTORNEY.

2,894,223
Patented July 7, 1959

2,894,223

ELECTRICAL DELAY LINES

John G. Sinclair, Jr., Manhattan Beach, Calif., assignor to Hughes Aircraft Company, Culver City, Calif., a corporation of Delaware Application March 30, 1956, Serial No. 575,696

2 Claims. (Cl. 333—31)

This invention relates to delay lines and more particularly to an electrical delay line providing compactness and higher efficiency.

Generally, electrical delay lines utilize separate inductors and capacitors in an electrical configuration for arriving at some predetermined electrical delay characteristic. Such electrical delay lines are known as lumped parameter delay lines and require a great number of separate components to achieve broad band widths of good fidelity.

Coaxial cables having distributed inductance and capacitance have been used for delay lines but in order to obtain even small time delays with high fidelity great cable length and volume are required.

A third type of delay line has both distributed and lumped parameters and involves solenoid windings, pie windings or progressive windings of coils which, even with ferromagnetic core materials, are seriously limited with respect to the fidelity obtainable with reasonable delay where small size units are needed.

This invention contemplates a compact electrical delay line in which a signal conductor in the form of a wire is uniformly spaced from another conductor in juxtaposed relation thereto. The second conductor is most commonly in the form of an inner ground plane. The distributed inductance of the wire is increased by immersing the conductor in a medium of high permeability. The distributed capacitance from the conductor to the inner ground plane is made higher by means of the medium which also has a high dielectric constant. In this application, permeability is designated by the symbol, mu, and dielectric constant by the symbol, K. Thus, the wire used as a distributed delay line immersed in the high K, high mu medium may have its delay time, band width, or rise and fall slopes of output pulses controlled by the characteristics of the immersing medium.

Accordingly, it is an object of this invention to provide an electrical delay line comprising a signal conductor immersed in a high mu, high K medium and positioned in a predetermined configuration within said medium with respect to an inner ground plane conductor.

It is also an object of this invention to provide a compact electrical delay line whose characteristics are controllable by the characteristics of a medium in which the conductors of said delay line are immersed.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the figures of the drawing are for the purpose of illustration and description only, and are not intended as a definition of the limits of the invention.

Figure 1:
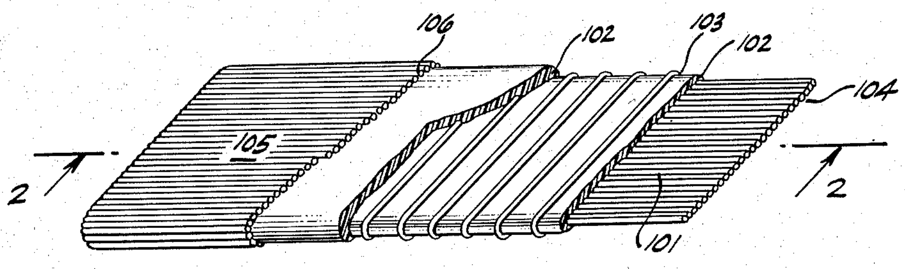
Fig. 1 is a partially cut-away view of a compact electrical delay line according to this invention.

Referring now to Fig. 1, illustrating one embodiment of this invention, a delay line device is shown incorporating an inner ground plane card 101 comprising a series of individual wire conductors 104 placed side-by-side in a flat plane and electrically connected or bonded together at one end thereof. The ground plane card 101 is coated with a ferromagnetic substance 102 of high permeability and high dielectric constant such as a mixture of a dispersion of powdered ferrite or iron particles in an appropriate plastic insulating binder or vehicle, such binder or vehicle being liquid or solid and having the requisite dielectric properties when used in conjunction with the powdered ferrite or iron. The properties of the medium thus formed are controllable by the choice of magnetic and electrical properties of the ferrite or powdered iron, the particle size, the particle shape. The electrical properties of the vehicle or binder, and the ratio of the amount of ferromagnetic material to the amount of vehicle or binder are other factors the control of which will effect the properties of the delay line. The epoxy resins are a class of materials having dielectric properties useful as a binder in the practice of this invention.

A signal conductor 103 is wound over the ground plane card coated with the high permeability substance 102 as illustrated in Fig. 1. Although the conductor 103 is shown here to be solenoid wound on the card, the winding need not necessarily be a solenoid. It may be in the form of a flat spiral or helical winding. Also, it may be noted that conductor 103 is shown wound with uniform spacing in the drawing but may be wound with progressively increasing spacing between adjacent turns. In any case, the signal conductor winding 103 is likewise coated with the high permeability substance 102. It may be seen in Fig. 1, that inner ground plane card 101 is now totally immersed in the high permeability substance 102 and likewise signal conductor 103 is also totally immersed in the substance 102, the substance 102 insulating the inner ground plane conductor card from the signal conductor wire. Also, the substance 102 completely encases each turn of the signal conductor 103 about the inner ground plane conductor card 101, and fills the spaces between adjacent parts of the signal conductor 103.

An outer ground plane conductor sheath 105 encloses the entire assembly as above described. Outer ground plane conductor sheath 105 is formed of parallel wires 106 laid side-by-side and electrically bonded together at the ends. The wires are coated with the same high permeability substance 102 as the previously mentioned conductors. Signal conductor 103 has an input lead and an output lead insulated from the inner ground plane conductor card 101 and outer ground plane conductor sheath 105. Although these wires are not illustrated in Fig. 1, they are further described below. Inner ground plane conductor card 101 is electrically bonded to outer ground plane conductor or sheath 105 as further described below but not specifically shown in Fig. 1.

Figure 2:
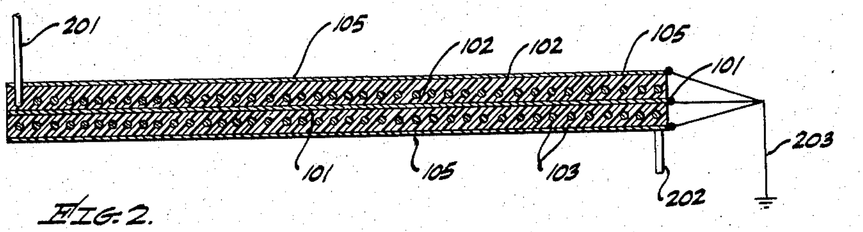
Fig. 2 is a cross-sectional view through line 2—2 of the delay line shown in Fig. 1.

Referring now to Fig. 2, there is shown a cross-section of the delay line of this invention. In Fig. 2 an input lead 201 and an output lead 202 are shown and it may be seen that these would represent the single continuous signal conductor 103 of Fig. 1 as it appears in cross-section. Also clearly illustrated in Fig. 2 is the relationship of inner ground plane 101 and outer ground plane 105 with their junctions to common ground terminal 203. The relationship of the dielectric ferromagnetic medium 102 surrounding all of the turns of 103 is clearly seen in Fig. 2. The size and cross-sectional shape of the signal conductor 103, the spacing between adjacent turns of the signal conductor 103 and the distance between the turns of conductor 103 and the inner and outer ground plane conductors 101 and 105, respectively, are each factors in the determination of the characteristic of a delay line constructed in accordance with this invention. These parameters may be adjusted to effect particular desired characteristics. Although the spacing is uniform, the spacing may, as previously indicated, vary progressively in either direction.

Figure 3:
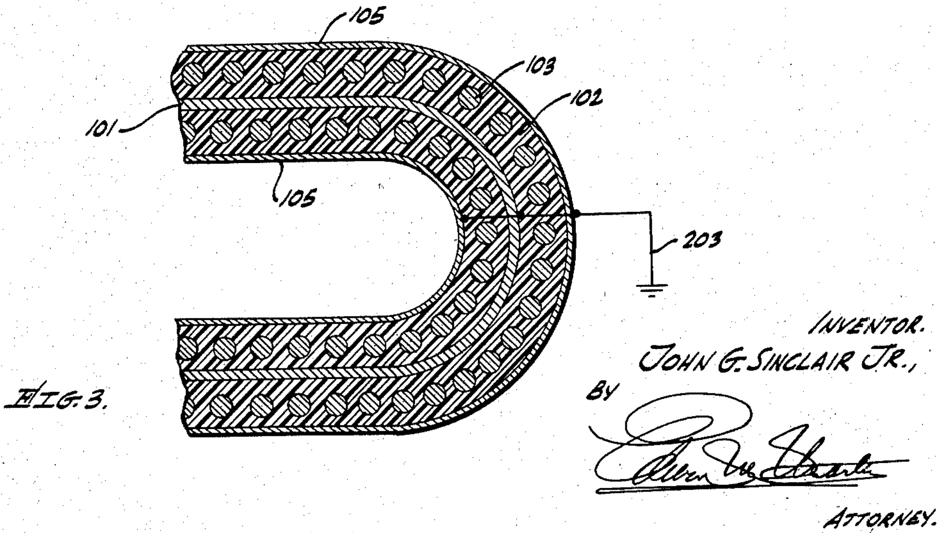
Fig. 3 is a cross-sectional view of a portion of a delay line in accordance with this invention to illustrate certain mechanical characteristics thereof.

In Fig. 3 there is shown what would amount to a cross-sectional portion of the delay line of Fig. 2 were it to be folded at some point along its length. It may be seen from Fig. 3 that this form of delay line may be arranged in a serpentine ribbon configuration or folded over any other form conveniently adaptable to the requirements of the delay line.

There has been described herein a compact form of electrical delay line structure incorporating a signal conductor immersed in a high permeability high dielectric constant, ferromagnetic medium. The signal conductor so immersed may either surround a ground plane conductor, or may be surrounded by the ground plane conductor or may both surround a ground plane conductor and at the same time be surrounded by the ground plane conductor.

What is claimed as new is:

1. An electrical delay line comprising: a ground plane conductor card covered with a high dielectric constant, high permeability medium; a signal conductor coil wound about said card, said signal conductor coil being covered with said high dielectric constant, high permeability medium, said signal conductor coil being insulated from said card by said medium; and each turn of said conductor coil being insulated from its adjacent turns by said medium; and a ground plane conductor sheath encasing said coil, and electrically bonded to said ground plane conductor card, said sheath being insulated from said coil by said medium.

2. An electrical delay line in accordance with claim 1 wherein said ground plane conductor card and said ground plane conductor sheath each comprise wires laid adjacent to each other, the ends of said wires of both said ground plane conductors being electrically bonded together.

References Cited in the file of this patent

UNITED STATES PATENTS

| | | |
|---|---|---|
| 2,387,783 | Tawney | Oct. 30, 1945 |
| 2,440,652 | Beverly | Apr. 27, 1948 |
| 2,467,857 | Rubel et al. | Apr. 19, 1949 |
| 2,515,683 | Acosta | July 18, 1950 |
| 2,619,537 | Kihn | Nov. 25, 1952 |
| 2,650,350 | Heath | Aug. 25, 1953 |
| 2,727,945 | Prache | Dec. 20, 1955 |
| 2,776,411 | Anderson | Jan. 1, 1957 |

FOREIGN PATENTS

| | | |
|---|---|---|
| 653,004 | Great Britain | May 9, 1951 |